United States Patent
Hong et al.

(10) Patent No.: US 10,788,911 B2
(45) Date of Patent: Sep. 29, 2020

(54) DISPLAY DEVICE INCLUDING A BUMP MEMBER

(71) Applicant: SAMSUNG DISPLAY CO., LTD., Yongin-si, Gyeonggi-Do (KR)

(72) Inventors: Won Ki Hong, Suwon-si (KR); Tae Hee Lee, Hwaseong-si (KR); Won Sang Park, Yongin-si (KR)

(73) Assignee: SAMSUNG DISPLAY CO., LTD., Yongin-si, Gyeonggi-Do (KR)

( * ) Notice: Subject to any disclaimer, the term of this patent is extended or adjusted under 35 U.S.C. 154(b) by 0 days.

(21) Appl. No.: 16/151,015

(22) Filed: Oct. 3, 2018

(65) Prior Publication Data

US 2019/0302939 A1    Oct. 3, 2019

(30) Foreign Application Priority Data

Mar. 29, 2018   (KR) ...................... 10-2018-0036459

(51) Int. Cl.
  *G06F 3/041* (2006.01)
  *G02F 1/1333* (2006.01)
(52) U.S. Cl.
  CPC ...... *G06F 3/0412* (2013.01); *G02F 1/133308* (2013.01); *G06F 3/0414* (2013.01); *G06F 3/0416* (2013.01); *G02F 2001/133388* (2013.01)
(58) Field of Classification Search
  None
  See application file for complete search history.

(56) References Cited

U.S. PATENT DOCUMENTS

| 8,654,524 | B2 | 2/2014 | Pance et al. |
| 9,274,660 | B2 | 3/2016 | Bernstein et al. |
| 2011/0037721 | A1* | 2/2011 | Cranfill ................... G06F 3/044 345/174 |
| 2014/0028575 | A1 | 1/2014 | Parivar et al. |
| 2015/0324056 | A1* | 11/2015 | Sato ......................... G06F 1/169 345/174 |
| 2016/0085330 | A1* | 3/2016 | Namkung ............. G06F 1/1643 29/592.1 |
| 2017/0285864 | A1* | 10/2017 | Pedder .................... G01L 1/205 |

FOREIGN PATENT DOCUMENTS

| JP | 6087394 | 3/2017 |
| KR | 10-1560389 | 10/2015 |
| KR | 10-2016-0149982 | 12/2016 |
| KR | 10-1792525 | 11/2017 |

* cited by examiner

*Primary Examiner* — Ifedayo B Iluyomade
(74) *Attorney, Agent, or Firm* — F. Chau & Associates, LLC

(57) ABSTRACT

A display device includes a display panel having a central display portion and a first edge display portion extending from the central display portion and including a first bent region. A pressure detection module overlaps the first edge and includes a first sensing electrode and a second sensing electrode which extend in different directions. A bump member is in direct contact with the pressure detection module. The bump member includes a plurality of first protruding patterns, each of which overlaps a node defined as a region in which the first sensing electrode and the second sensing electrode cross.

18 Claims, 13 Drawing Sheets

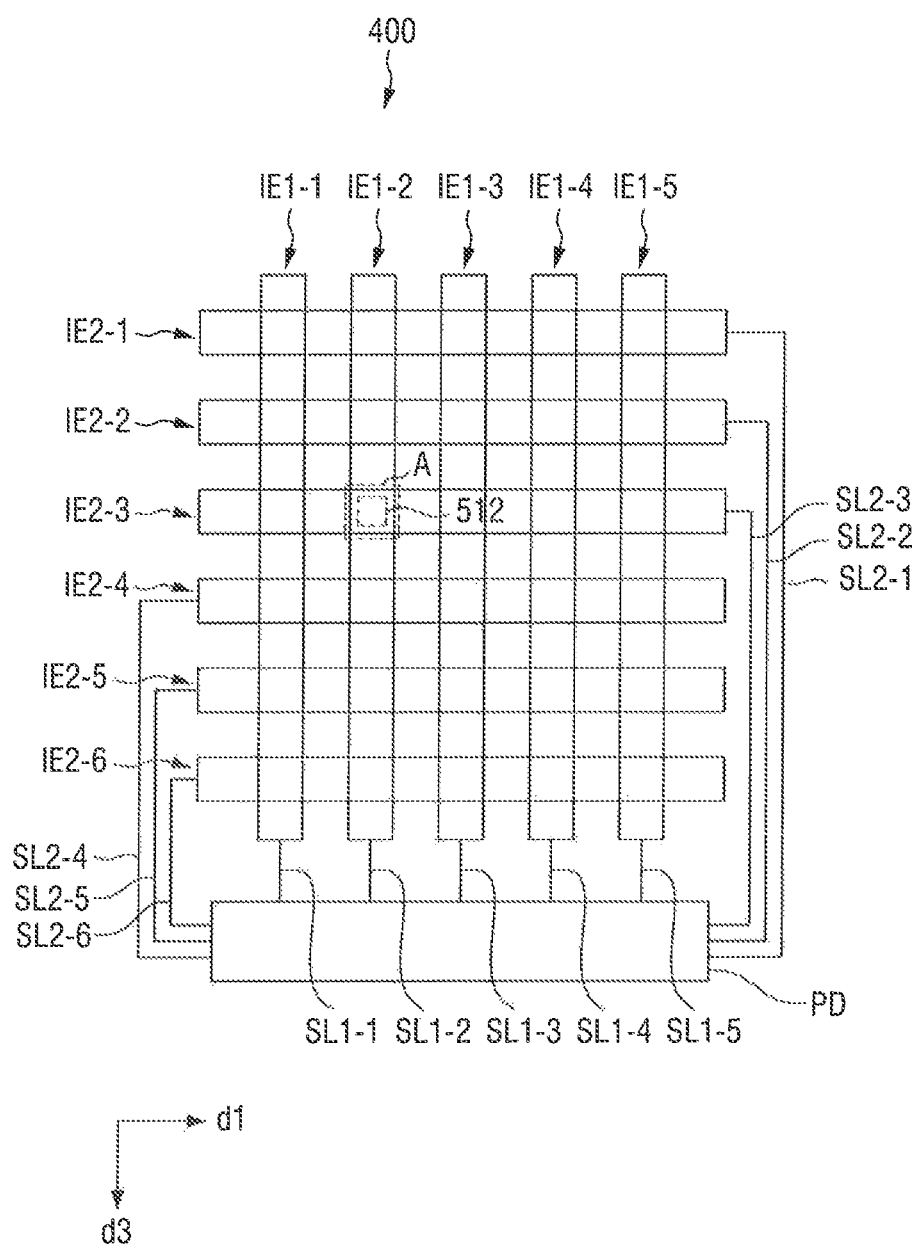

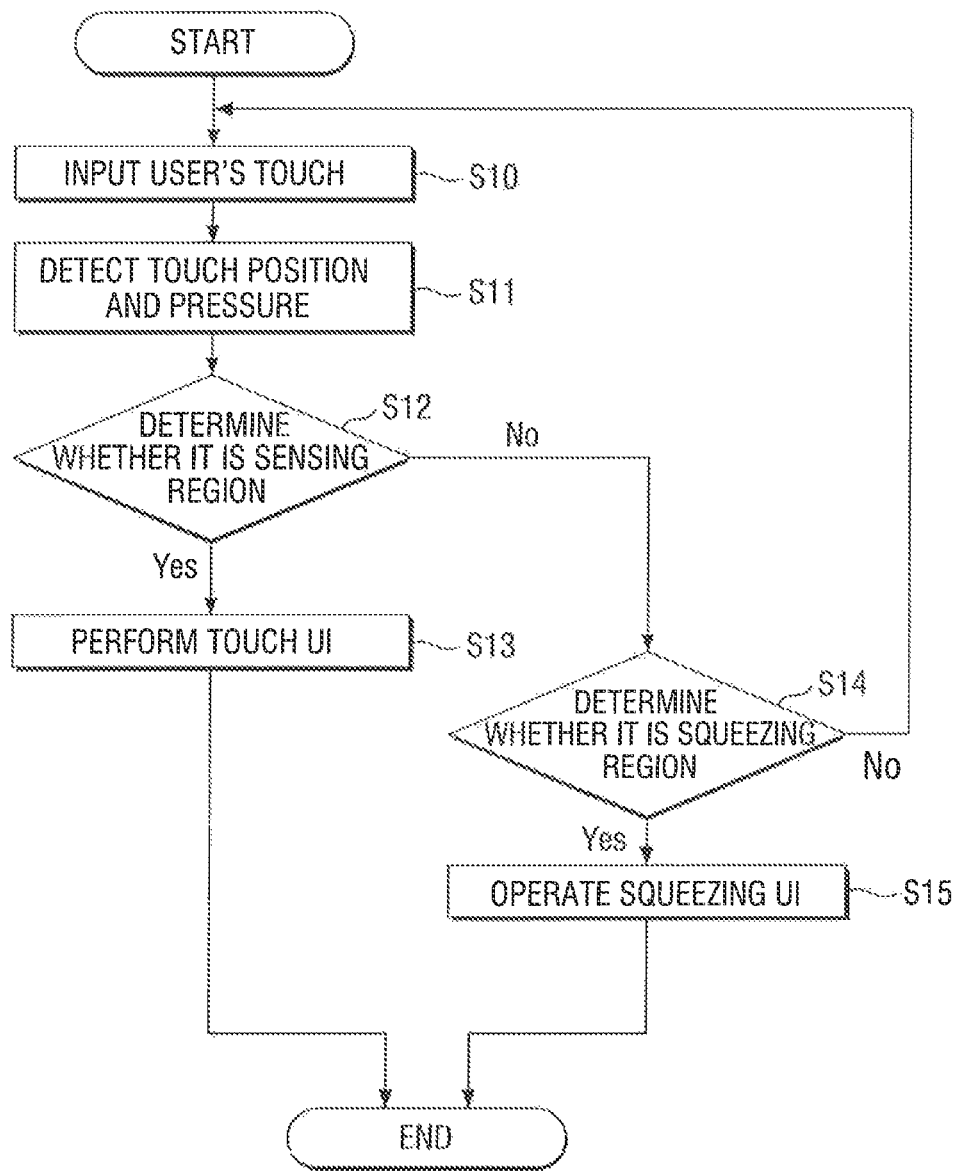

DISPLAY DEVICE INCLUDING A BUMP MEMBER

This application claims priority to Korean Patent Application No. 10-2018-0036459, filed on Mar. 29, 2018 in the Korean Intellectual Property Office, the disclosure of which is herein incorporated by reference in its entirety, of the present disclosure

TECHNICAL FIELD

The present disclosure relates to a display device and, more specifically, to a display device including one or more bump members.

DISCUSSION OF THE RELATED ART

Display devices are devices that are capable of displaying images. Common types of display devices include liquid crystal displays (LCDs), organic light-emitting diode (OLED) displays, and the like.

Among the various types of display devices that are presently available, the LCD is one of the most widely used. The LCD includes two substrates, on which electric field generating electrodes such as pixel electrodes, common electrodes, and the like are disposed, and a liquid crystal layer interposed between the two substrates. The LCD displays an image by applying a voltage to the electric field generating electrodes to generate an electric field across the liquid crystal layer, thereby determining an orientation of liquid crystal molecules in the liquid crystal layer and thereby controlling polarization of incident light.

Among the various types of display devices, the OLED display is rapidly gaining adoption. The OLED display uses OLEDs to generates light in the form of an image by recombining electrons and holes within an emissive layer. The OLED display has a high response speed, a high luminance, and a wide viewing angle, and also consumes less power than many comparable display devices.

SUMMARY

A display device includes a display panel having a central display portion and a first edge display portion extending from the central display portion and including a first bent region. A pressure detection module overlaps the first edge and includes a first sensing electrode and a second sensing electrode which extend in different directions. A bump member is in direct contact with the pressure detection module. The bump member includes a plurality of first protruding patterns, each of which overlaps a node defined as a region in which the first sensing electrode and the second sensing electrode cross.

A display device includes a display panel having a central display portion and a first edge display portion extending from the central display portion and including a first bent region.

A pressure detection module overlaps the first edge display portion. A bump member is in direct contact with the pressure detection module and including a plurality of first protruding patterns. The pressure detection module includes a plurality of first sensing electrodes extending in a first direction and a plurality of second sensing electrodes extending in a second direction, crossing the first direction. The second sensing electrodes are insulated from the plurality of first sensing electrodes. At least one of the plurality of first protruding patterns is disposed in a region in which the plurality of first sensing electrodes and the plurality of second sensing electrodes cross.

A display device includes a display panel having a substantially flat display region, a first substantially curved display region on one side of the substantially flat region, and a second substantially curved region on an opposite side of the substantially flat region. The substantially flat display region and the first and second substantially curved regions are configured to display an image. A first bump portion is disposed below the display panel. A pressure detection module is disposed below the first bump portion. A second bump portion is disposed below the pressure detection module. Each of the first bump portion and the second bump portion includes a base layer and a protruding pattern. The protruding pattern substantially aligns with intersections of sensing lines of the pressure detection module.

BRIEF DESCRIPTION OF THE DRAWINGS

The above and other aspects and features of the present disclosure will become more apparent by describing exemplary embodiments thereof in detail with reference to the attached drawings, in which:

FIG. 4 is a schematic view illustrating an example of a pressure detection module shown in FIG. 2;

FIG. 6 is a flowchart illustrating an operation of the edge display portion of the display device according to exemplary embodiments of the present disclosure when the edge display portion is touched;

DETAILED DESCRIPTION OF THE EMBODIMENTS

Figure 1:
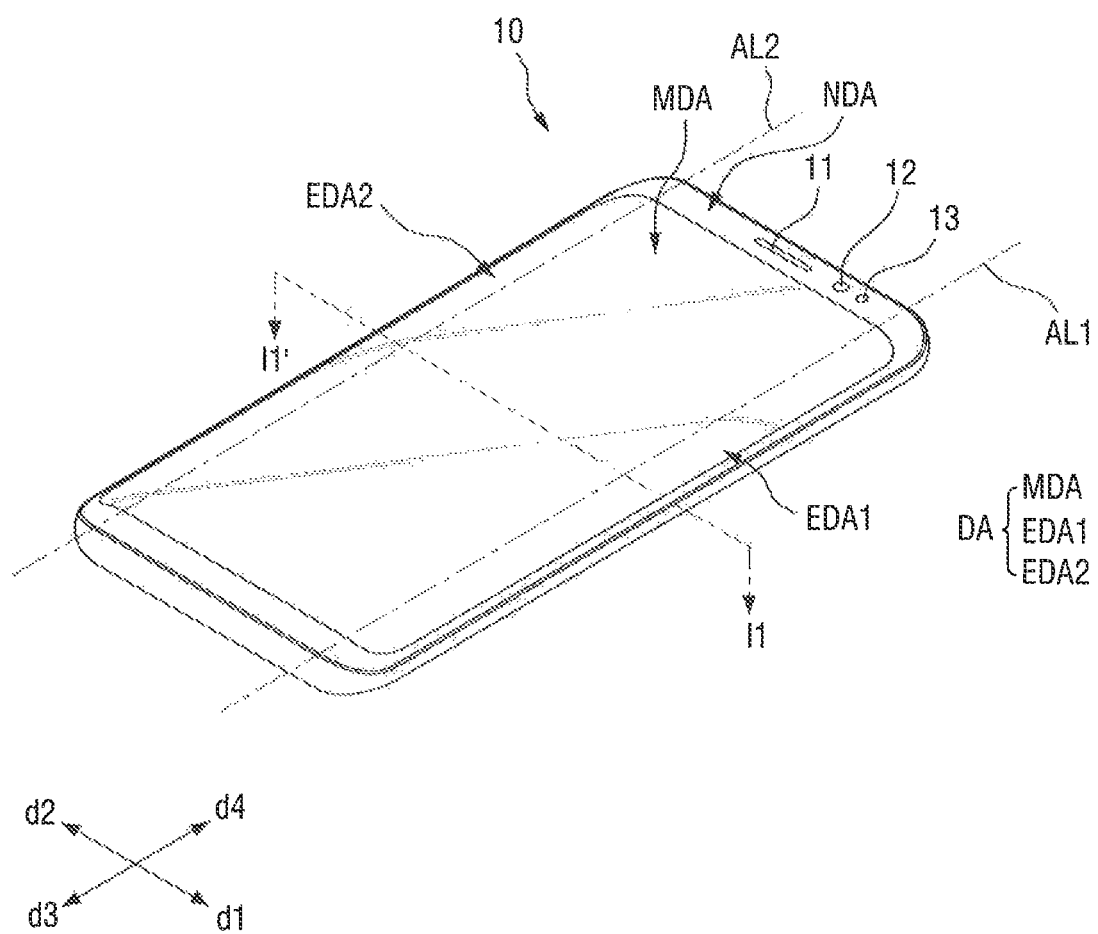
FIG. 1 is a perspective view illustrating a display device according to an exemplary embodiment of the present disclosure.

In describing exemplary embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

Where an element is described as being related to another element such as being "on" another element or "located on" a different layer or a layer, includes both a case where an element is located directly on another element or a layer and a case where an element is located on another element via another layer or still another element. In the entire description of the invention, the same drawing reference numerals may be used to represent the same elements across various figures.

Although the terms "first, second, and so forth" are used to describe diverse constituent elements, such constituent elements are not limited by the terms. The terms are used only to discriminate a constituent element from other constituent elements. Accordingly, in the following description, a first constituent element may be a second constituent element.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Hereinafter, exemplary embodiments of the present disclosure will be described with reference to the accompanying drawings.

FIG. 1 is a perspective view illustrating a display device according to an exemplary embodiment of the present disclosure.

A display device 10 may be divided into a display region DA and a non-display region NDA.

The display region DA is defined as a region for displaying an image. The display region DA may include a central display portion MDA, a first edge display portion EDA1, and a second edge display portion EDA2.

The central display portion MDA is separated from the first edge display portion EDA1 and the second edge display portion EDA2 by a first imaginary line AL1 and a second imaginary line AL2, respectively. The central display portion MDA is located between the first imaginary line AL1 and the second imaginary line AL2.

The first edge display portion EDA1 may be located adjacent to the central display portion MDA in a first direction d1 with respect to the first imaginary line AL1. The second edge display portion EDA2 may be located adjacent to the central display portion MDA in a second direction d2 with respect to the second imaginary line AL2. According to an exemplary embodiment of the present disclosure, the first edge display portion EDA1 and the second edge display portion EDA2 may be bent to have a predetermined curvature.

In one exemplary embodiment of the present disclosure, the central display portion MDA, the first edge display portion EDA1, and the second edge display portion EDA2 may independently display images. For example, different images may be displayed on the display portions at the same time, or an image may be displayed only on the central display portion MDA and might not be displayed on the first edge display portion EDA1 or the second edge display portion EDA2.

The non-display region NDA is defined as a region which is located outside the display region DA and in which no image is displayed. In FIG. 1, the non-display region NDA is shown as surrounding the display region DA, but the present disclosure is not limited thereto. A speaker module 11, a camera module 12, and a sensor module 13 may each be disposed in the non-display region NDA. In one exemplary embodiment of the present disclosure, the sensor module 13 may include an illuminance sensor, a proximity sensor, an infrared sensor, and/or an ultrasonic sensor. In one exemplary embodiment of the present disclosure, the sensor module 13 may perform a function of recognizing a user's iris. An arrangement of the speaker module 11, the camera module 12, and the sensor module 13 is not limited to that shown in FIG. 1.

Figure 2:
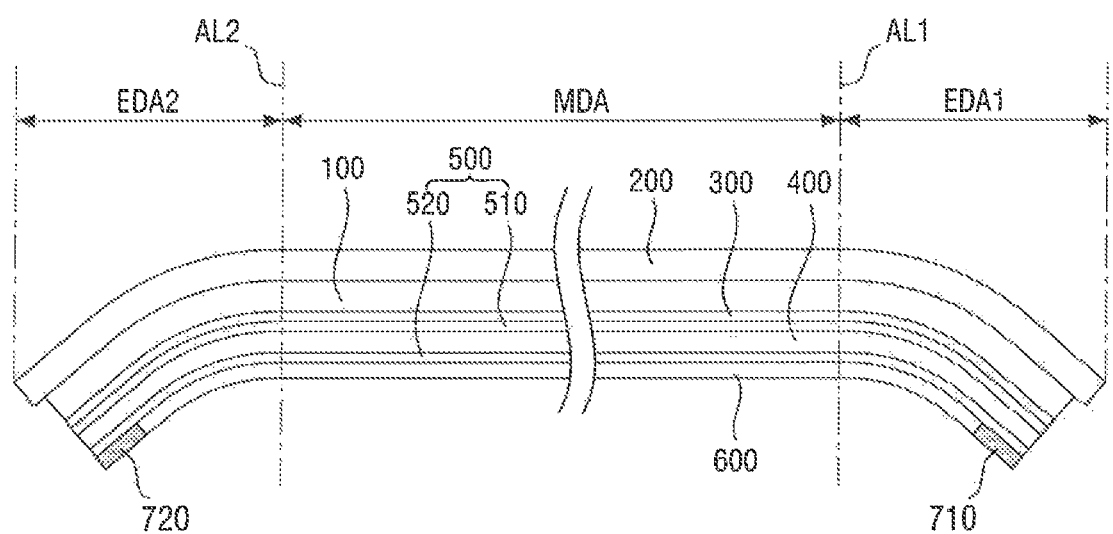
FIG. 2 is a cross-sectional view taken along line I1-I1' of FIG. 1.

FIG. 2 is a cross-sectional view taken along line I1-I1' of FIG. 1.

Referring to FIG. 2, the display device 10 may include a display panel 100, a window member 200, a composite sheet 300, a pressure detection module 400, a bump member 500, a support portion 600, a first waterproof member 710, and a second waterproof member 720.

The display panel 100 is defined as a panel for displaying the above-described image. In one exemplary embodiment of the present disclosure, the display panel 100 may be an organic light-emitting display panel, a liquid crystal display panel, a quantum dot display panel, or the like. Hereinafter, the case in which the display panel 100 is an organic light-emitting display panel will be described.

The window member 200 may be disposed on the display panel 100. The window member 200 may protect the display panel 100 from external scratches or the like. An input sensing panel and an anti-reflection panel may be further disposed between the window member 200 and the display panel 100.

The input sensing panel is disposed on the display panel 100 and may be configured to sense a user's finger/hand or a touch pen/stylus. The anti-reflection panel is disposed on the input sensing panel and may reduce reflectivity due to external light incident from above the window member 200. The anti-reflection panel may be disposed below the input sensing panel. In one exemplary embodiment of the present disclosure, the display panel 100, the input sensing panel, and the anti-reflection panel may be coupled to each other through separate adhesive members. Here, the adhesive members may be a pressure-sensitive adhesive (PSA) member, an optically clear adhesive (OCA) member, and/or an optically clear resin (OCR) film. According to an exemplary embodiment of the present disclosure, the display panel 100, the input sensing panel, and the anti-reflection panel may be directly disposed without an adhesive member. For example, the input sensing panel may be directly disposed on the display panel 100 without an adhesive member disposed therebetween, with an upper surface of the display panel 100 as a base surface. Further, the input sensing panel may be integrated with the pressure detection module 400 described above.

The composite sheet 300 may be disposed below the display panel 100. In one exemplary embodiment of the present disclosure, the composite sheet 300 may include a buffer sheet and a heat dissipation sheet.

The buffer sheet may absorb impacts applied from the outside and increase the impact resistance of the display panel 100. Accordingly, the buffer sheet may include a material capable of impact absorption. In one exemplary embodiment of the present disclosure, the buffer sheet may include an elastic polymeric resin, for example, polyethylene, polycarbonate, polyurethane, polypropylene, or the like. Alternatively, the buffer sheet may include a foam sponge made of a liquid rubber, a urethane-based material, or an acrylic-based material.

The heat dissipation sheet may emit heat generated in the display panel 100 to the outside. In one exemplary embodiment of the present disclosure, the heat dissipation sheet may include copper (Cu), may include a metal such as silver (Ag), a copper alloy, aluminum (Al), or the like having high thermal conductivity other than copper (Cu), or may include a carbon-based material such as graphite, graphene, or the like.

In one exemplary embodiment of the present disclosure, the pressure detection module 400 may be disposed below the composite sheet 300. In one exemplary embodiment of the present disclosure, the pressure detection module 400 may detect the user's input, for example, the pressure of the user's finger. In one exemplary embodiment of the present disclosure, the pressure detection module 400 may be fully formed on a lower portion of the display panel 100. For example, the pressure detection module 400 may be disposed to overlap the first edge display portion EDA1 and the second edge display portion EDA2 as well as the central display portion MDA. Accordingly, in the display device 10, according to exemplary embodiments of the present disclosure, a touch pressure may be detected anywhere in the display region DA. The pressure detection module 400 may include a plurality of sensing electrodes for pressure detection. The pressure detection module 400 will be described in greater detail below with reference to FIG. 4. When the plurality of sensing electrodes are formed of a transparent material, the pressure detection module 400 may be disposed on the display panel 100.

The bump member 500 may effectively transmit a pressure to the pressure detection module 400. For example, the bump member 500 may allow the touch pressure, which is input by the user, to be concentrated on the pressure detection module 400. To this end, the bump member 500 may be formed of a flexible metal. However, the material of the bump member 500 is not particularly limited, and the bump member 500 may be formed of an elastic material such as flexible plastic, rubber, or the like.

The bump member 500 may include a first bump portion 510 and a second bump portion 520. The first bump portion 510 is located on the pressure detection module 400 and may be in direct contact with one surface of the pressure detection module 400. The second bump portion 520 is located below the pressure detection module 400 and may be in direct contact with the other surface of the pressure detection module 400 opposite one surface of the pressure detection module 400. For example, the first bump portion 510 and the second bump portion 520 may be symmetrical with respect to each other about the pressure detection module 400.

The bump member 500 will be described in more detail below with reference to FIGS. 3A to 3F.

Figure 3A:
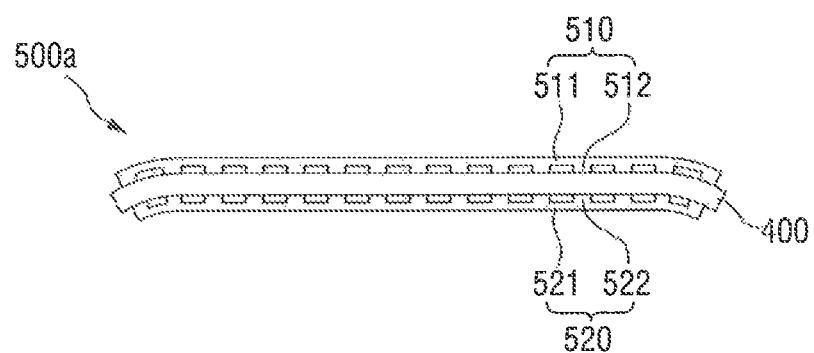
FIGS. 3A to 3F are views illustrating examples of a bump member shown in FIG. 2 in more detail.
Figure 3B:
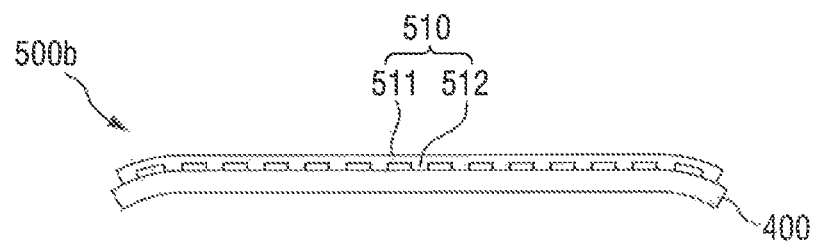
Figure 3C:
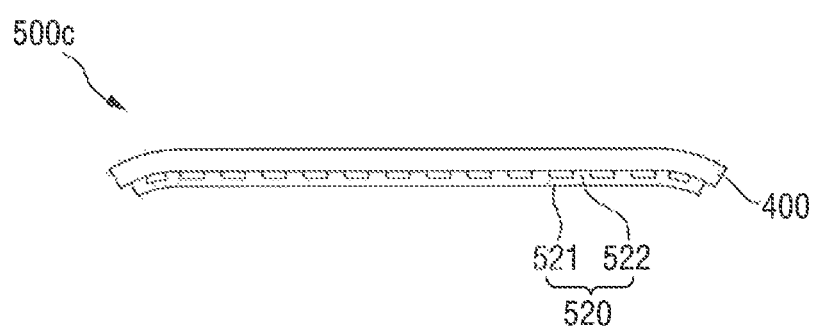
Figure 3D:
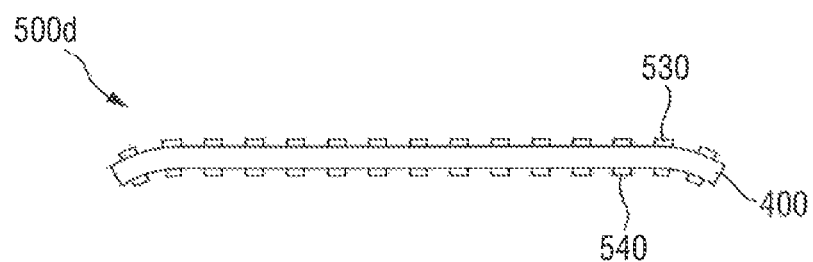
Figure 3E:
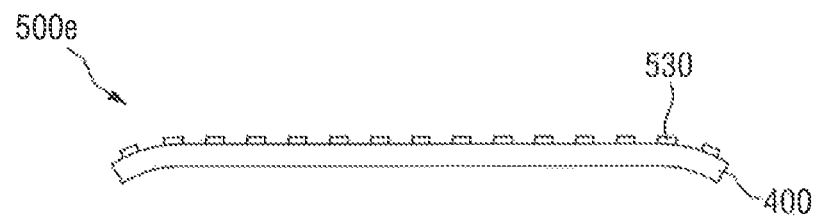
Figure 3F:
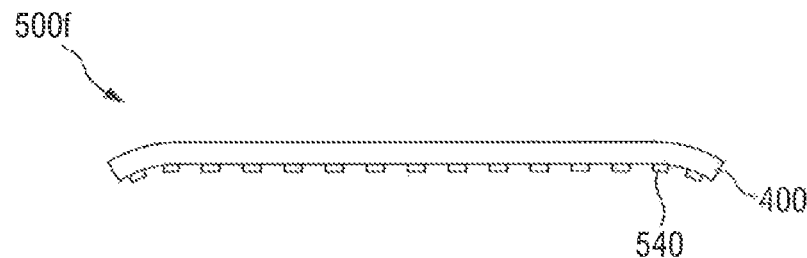

FIGS. 3A to 3F1 are views illustrating examples of the bump member shown in FIG. 2 in more detail.

Referring to FIG. 3A, a bump member 500a may include a first bump portion 510 and a second bump portion 520. The first bump portion 510 may include a first base layer 511 and a plurality of first protruding patterns 512 extending from the first base layer 511 in a direction toward the pressure detection module 400. The second bump portion 520 may include a second base layer 521 and a plurality of second protruding patterns 522 extending from the second base layer 521 in a direction opposite the extending direction of the plurality of first protruding patterns 512. Hereinafter, among the first bump portion 510 and the second bump portion 520, the first bump portion 510 will be mainly described. However, it is to be understood that the second bump portion 520 is similarly configured.

The plurality of first protruding patterns 512 may be in direct contact with one surface of the pressure detection module 400. In one exemplary embodiment of the present disclosure, the first base layer 511 and the plurality of first protruding patterns 512 may be integrated, but may alternatively be separately formed and then coupled. A height of the first base layer 511 is not particularly limited, but in one exemplary embodiment of the present disclosure, the first base layer 511 may have a height of 100 μm or less. Sizes of the plurality of first protruding patterns 512 may be smaller than a size of a node A (see FIG. 4) formed by crossing the plurality of sensing electrodes to be described below. This will be described below with reference to FIG. 4.

In FIG. 3A, the shapes of the first bump portion 510 and the second bump portion 520 are shown to be the same, but the present disclosure is not limited thereto. For example, the shapes of the first bump portion 510 and the second bump portion 520 may be different from each other.

Hereinafter, an example of the bump member 500 will be described. To the extent that a detailed description of various elements is omitted, it may be assumed that these elements are at least similar to corresponding elements that have previously been described.

A bump member 500b shown in FIG. 3B differs from the bump member 500a shown in FIG. 3A in that a second bump portion 520 is omitted and only a first bump portion 510 is included. A bump member 500c shown in FIG. 3C differs from the bump member 500a shown in FIG. 3A in that a first bump portion 510 is omitted and only a second bump portion 520 is included. In other respects, the various bump members 500a, 500b, and 500c are s A bump member 500d shown in FIG. 3I) does not include the first and second base layers 511 and 521 shown in FIG. 3A. For example, a first bump portion 530 may include a plurality of first protruding patterns which protrude upward from one surface of the pressure detection module 400 with respect to FIG. 3D. A second bump portion 540 may include a plurality of second protruding patterns which protrude from the other surface of the pressure detection module 400 in a direction opposite an extending direction of the plurality of first protruding patterns.

A bump member 500e shown in FIG. 3E differs from the bump member 500d shown in FIG. 3D in that a second bump portion 540 is omitted. A bump member 500f shown in FIG. 3F differs from the bump member 500d shown in FIG. 3D in that a first bump portion 530 is omitted. However, in other respects, the bump members 500d and 500e may be at least similar.

Referring again to FIG. 2, the support portion 600 may be located below the pressure detection module 400. The support portion 600 may protect the display panel 100, the pressure detection module 400, and the like. A material of the support portion 600 is not particularly limited.

A first waterproof member 710 may be disposed adjacent to one side surface of the support portion 600. In one exemplary embodiment of the present disclosure, the first waterproof member 710 may be in direct contact with one side surface of the support portion 600.

A second waterproof member 720 may be disposed adjacent to the other side surface of the support portion 600. In one exemplary embodiment of the present disclosure, the second waterproof member 720 may be in direct contact with the other side surface of the support portion 600. The first waterproof member 710 and the second waterproof member 720 may prevent moisture from permeating into either side of the display device 10.

In one exemplary embodiment of the present disclosure, the first waterproof member 710 and the second waterproof member 720 may be a double-sided tape having a waterproof function. However, the first waterproof member 710 and the second waterproof member 720 are not limited to the double-sided tape, and may be provided in various forms such as an adhesive and the like.

Next, a pressure sensing method of the pressure detection module 400 will be described in more detail with reference to FIG. 4.

FIG. 4 is a schematic view illustrating an example of the pressure detection module shown in FIG. 2.

Referring to FIG. 4, the pressure detection module 400 may include a plurality of first sensing electrodes IE1-1 to IE1-5, a plurality of second sensing electrodes IE2-1 to IE2-6, a plurality of first signal lines SL1-1 to SL1-5, a plurality of second signal lines SL2-1 to SL2-6, and a pad portion PD.

The plurality of first sensing electrodes IE1-1 to IE1-5 may extend in a third direction d3. The plurality of second sensing electrodes IE2-1 to IE2-6 may extend in a first direction d1. For example, the plurality of first sensing electrodes IE1-1 to IE1-5 and the plurality of second sensing electrodes IE2-1 to IE2-6 may cross each other. A plurality of nodes A, which are defined as regions in which the plurality of first sensing electrodes IE1-1 to IE1-5 and the plurality of second sensing electrodes IE2-1 to IE2-6 cross, may have a size greater than the size of the bump member 500 described above, more particularly, than the sizes of the plurality of first protruding patterns 512 shown in FIGS. 3A and 3B. Accordingly, by highly concentrating the user's touch pressure on the plurality of nodes A, it is possible to increase the accuracy of the pressure detection.

The plurality of first sensing electrodes IE1-1 to IE1-5 may be connected to the pad portion PD through the plurality of first signal lines SL1-1 to SL1-5, respectively. The plurality of second sensing electrodes IE2-1 to IE2-6 may be connected to the pad portion PD through the plurality of second signal lines SL2-1 to SL2-6, respectively. Accordingly, the plurality of first sensing electrodes IE1-1 to IE1-5 and the plurality of second sensing electrodes IE2-1 to IE2-6 may receive signals necessary for touch pressure sensing from the pad portion PD through the plurality of first signal lines SL1-1 to SL1-5 and the plurality of second signal lines SL2-1 to SL2-6, respectively.

The plurality of first sensing electrodes IE1-1 to IE1-5 and the plurality of second sensing electrodes IE2-1 to IE2-6 are insulated from each other. In one exemplary embodiment of the present disclosure, the plurality of first sensing electrodes IE1-1 to IE1-5 and the plurality of second sensing electrodes IE2-1 to IE2-6 may be disposed on different layers. Accordingly, the touch pressure may be detected through mutual electrostatic capacitance change between the plurality of first sensing electrodes IE1-1 to IE1-5 and the plurality of second sensing electrodes IE2-1 to IE2-6. Further, the pressure detection module 400 may detect the touch position as well as the touch pressure. According to an exemplary embodiment of the present disclosure, the pressure detection module 400 may be configured to have one of the plurality of first sensing electrodes IE1-1 to IE1-5 and the plurality of second sensing electrodes IE2-1 to IE2-6 as a ground, and may sense self-electrostatic capacitance through the other electrode.

The pressure detection module 400 may further include a pressure sensitive material, which is in direct contact with at least one of the plurality of first sensing electrodes IE1-1 to IE1-5 and the plurality of second sensing electrodes IE2-1 to IE2-6, in order to increase the accuracy of pressure detection. In one exemplary embodiment of the present disclosure, the pressure sensitive material may be in direct contact with at least one of the plurality of first sensing electrodes IE1-1 to IE1-5 and the plurality of second sensing electrodes IE2-1 to IE2-6 by utilizing a printing method after the formation of the plurality of first sensing electrodes IE1-1 to IE1-5 or the plurality of second sensing electrodes IE2-1 to IE2-6.

The arrangement of the plurality of first signal lines SL1-1 to SL1-5 and the plurality of second signal lines SL2-1 to SL2-6 is not limited to that shown in FIG. 4. Further, the plurality of first signal lines SL1-1 to SL1-5 and the plurality of second signal lines SL2-1 to SL2-6 may be replaced by a circuit board or the like manufactured separately and then coupled.

The pressure detection method of the pressure detection module 400 is not limited to above-described method. According to an exemplary embodiment of the present disclosure, the pressure may be detected by a strain gauge method, a piezo method, or the like.

Hereinafter, a method of driving the display device 10 using the pressure detection module 400 will be described in more detail with reference to FIGS. 5A to 8.

First, an operation of an edge display portion according to user input will be described as an example.

Figure 5A:
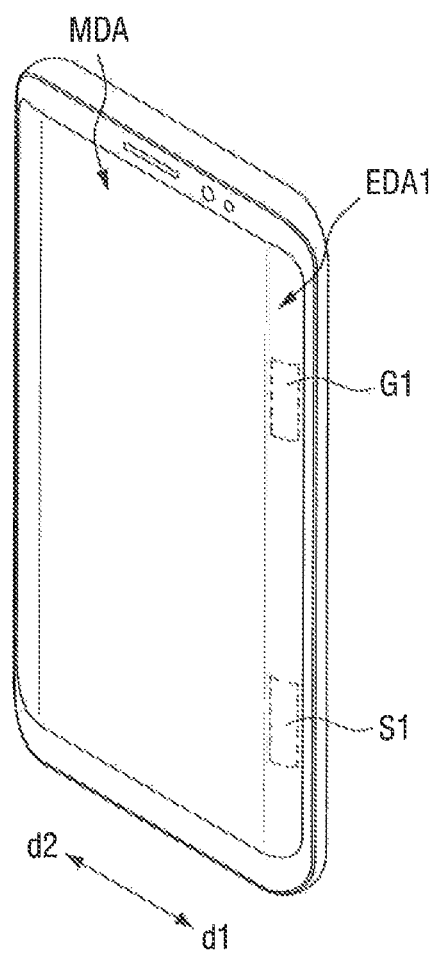
FIGS. 5A and 5B are views illustrating an example of a pressure sensing region located at an edge display portion.
Figure 5B:
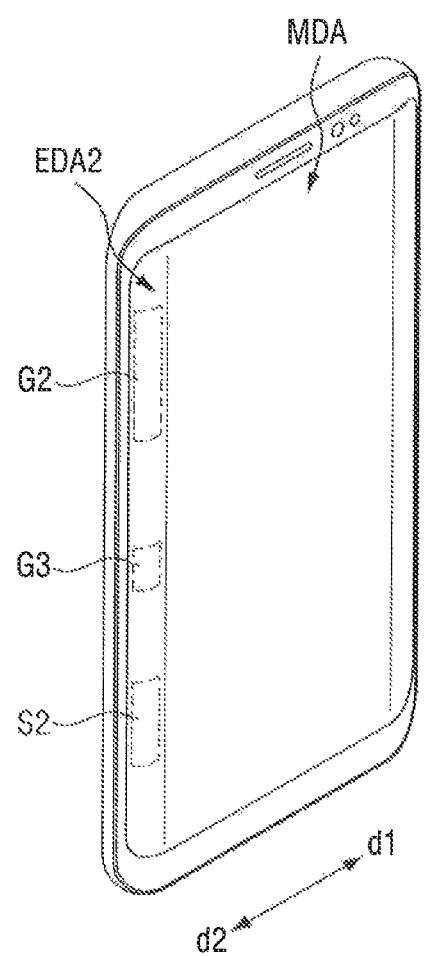

FIGS. 5A and 5B are views illustrating an example of a pressure sensing region located at the edge display portion. FIG. 6 is a flowchart illustrating the operation of the edge display portion of the display device according to exemplary embodiments of the present disclosure when the edge display portion is touched.

Referring to FIGS. 2, 5A, 5B, and 6, the first edge display portion EDA1 may include a first sensing region G1 and a first squeezing region S1. The second edge display portion EDA2 may include a second sensing region G2, a third sensing region G3, and a second squeezing region S2. Hereinafter, a function performed by the first to third sensing regions G1 to G3 is defined as a function of a touch user interface (UI) and a function performed by the first and second squeezing regions S1 and S2 is defined as a function of a squeezing UI.

The first sensing region G1 is defined as a region in which a power on/off function may be performed. For example, when user's touch input is provided in the first sensing region G1, the power on/off function of the display device 10 may be performed through a predetermined operation. For example, when the user's touch input is provided in the first sensing region G1, the pressure detection module 400 shown in FIG. 2 may determine whether a pressure value is greater than or equal to a predetermined value and turn on or off the power of the display device 10 on the basis of a result of the determination.

The second sensing region G2 is defined as a region in which a volume control function is performed. For example, a volume of the display device 10 may be adjusted based on an input of the user provided in the second sensing region G2. The third sensing region G3 is defined as a region in which a predetermined application is performed when a touch pressure higher than or equal to the predetermined value is provided. The type of the performed application is not particularly limited, and for example, a camera function, a music playing function, a virtual assistant (e.g. BIXBY provided by Samsung Electronics) function, and the like may be performed. The third sensing region G3 may be omitted.

For example, the first to third sensing regions G1 to G3 may substitute the roles performed by conventional physical buttons through touch pressure sensing. Positions at which the first to third sensing regions G1 to G3 are located, and shapes and sizes of the first to third sensing regions G1 to G3 are not limited to those shown in FIGS. 5A and 5B.

The first squeezing region S1 and the second squeezing region S2 are defined as regions in which when a touch is input by the user, predetermined functions are performed based on the user's touch input. For example, when the user simultaneously presses the first squeezing region S1 and the second squeezing region S2 at a predetermined pressure or higher, the predetermined application may be performed. Here, the type of the predetermined application is not particularly limited, and the predetermined application may include, for example, a camera function, a music playing function, a Bixby function, and the like. Further, the type of the predetermined application may be arbitrarily set by the user. According to an exemplary embodiment of the present disclosure, when it is assumed that the first squeezing region S1 and the second squeezing region S2 are defined as one squeezing region unlike those shown in the drawings, the display device 10 may include a plurality squeezing regions. For example, a function of independently performing an application may be given for each of the plurality of squeezing regions.

In one exemplary embodiment of the present disclosure, the first squeezing region S1 and the second squeezing region S2 may be formed symmetrically with respect to each other, but the present disclosure is not limited thereto. Further, the display device 10 may further include a separate squeezing region.

Further, as described above, the pressure detection module 400 may be entirely formed over the first edge display portion EDA1 and the second edge display portion EDA2, but according to an exemplary embodiment of the present disclosure, the pressure detection module 400 may be formed in only a region necessary for pressure sensing, for example, the first to third sensing regions G1 to G3, the first squeezing region S1, and the second squeezing region S2. In this case, the pressure detection module 400 may be formed as an independent pressure detection module to at least partially overlap each of the first to third sensing regions G1 to G3, the first squeezing region S1, and the second squeezing region S2, or may be formed as an integrated pressure detection module.

When a touch is input by the user (S10), the pressure detection module 400 may detect a touch position and a touch pressure of the user (S11) and then determine whether the touch position corresponds to a predetermined sensing region (S12). When the user touches one of the first to third sensing regions G1 to G3 (Yes, S12), the above-described touch UI may be operated (S13). For example, when the user touches the second sensing region G2, the pressure detection module 400 may determine whether a touch pressure value is higher than or equal to the predetermined value and adjust the volume of the display device 10.

On the other hand, when the user touches the first squeezing region S1 and the second squeezing region S2 (No, S12), the pressure detection module 400 may determine whether a predetermined operating condition is satisfied (S14). For example, the pressure detection module 400 may determine whether the user simultaneously presses the first squeezing region S1 and the second squeezing region S2 at a predetermined pressure value or higher. When the predetermined operating condition is satisfied (Yes, S14), the squeezing UI, for example, the predetermined application, may be operated immediately (S15).

For example, the display device 10 may detect the touch input position and the pressure of the user using the pressure detection module 400, and compare the touch input position and the pressure to predetermined conditions, so that a specific function may be performed without physical buttons.

Next, an underwater environment mode will be described with reference to FIG. 7.

Figure 7:
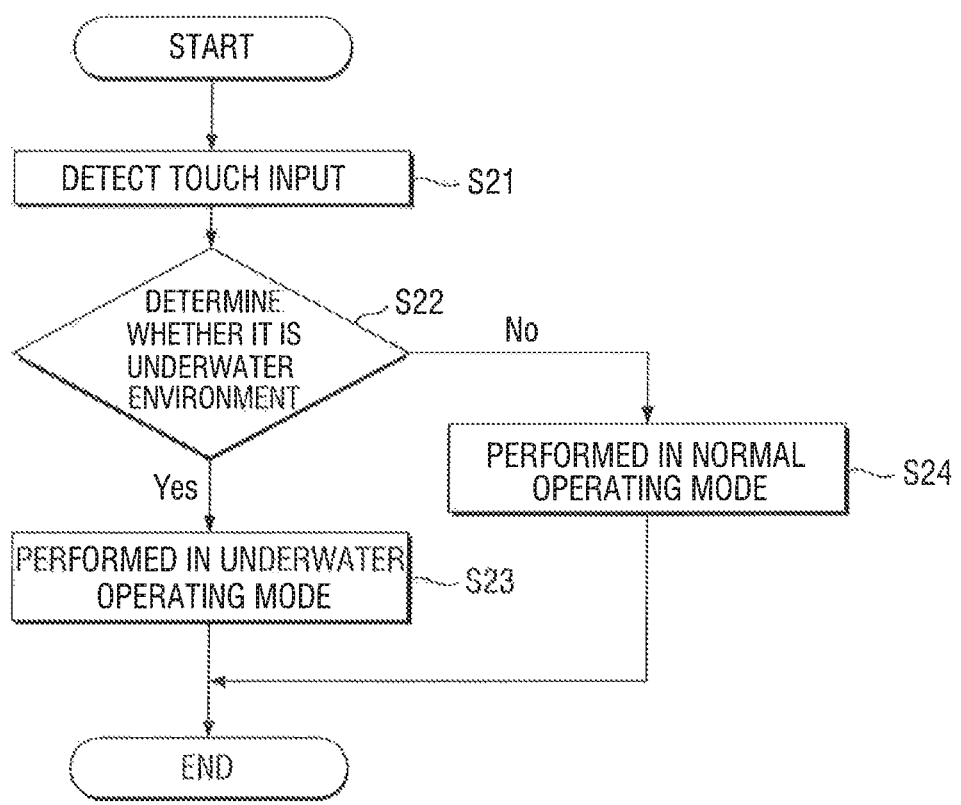
FIG. 7 is a flowchart illustrating an underwater environment operation of the display device according to exemplary embodiments of the present disclosure.

FIG. 7 is a flowchart illustrating an underwater environment operation of the display device according to exemplary embodiments of the present disclosure.

When the display device 10 is submerged in the water, the water may be brought into contact with a surface of the display device 10. The pressure detection module 400 may detect a region in which a touch is input (S21). The pressure detection module 400 may then determine whether the environment is an underwater environment on the basis of the detected result (S22). In one exemplary embodiment of the present disclosure, the pressure detection module 400 may determine that the environment is the underwater environment when the region in which the touch is input is ¼ or more of a total area of the display region DA (see FIG. 1). According to an exemplary embodiment of the present disclosure, the pressure detection module 400 may determine whether the environment is the underwater environment on the basis of the edge display portion. For example, the pressure detection module 400 may determine that the environment in which a touch input area of the edge display portion is greater than or equal to ¼ of the total area of the first edge display portion EDA1 and the second edge display portion EDA2 is the underwater environment.

When it is determined that the environment is the underwater environment (Yes, S22), the display device 10 may operate in an underwater operating mode (S23). In the underwater operating mode, only an application required by the user may be exposed on a screen. Therefore, it is possible to easily perform the application required by the user even in the underwater environment. On the other hand, when it is determined that the environment is not the underwater environment (No, S22), the display device 10 may operate in a normal operating mode (S24).

For example, the display device 10 may determine whether the environment is the underwater environment without a separate sensor for determining whether an environment is in an underwater environment, and may accordingly operate in the underwater environment mode.

Next, an application function using a touch pressure input to the central display portion will be described with reference to FIGS. 8A and 8B.

Figure 8A:
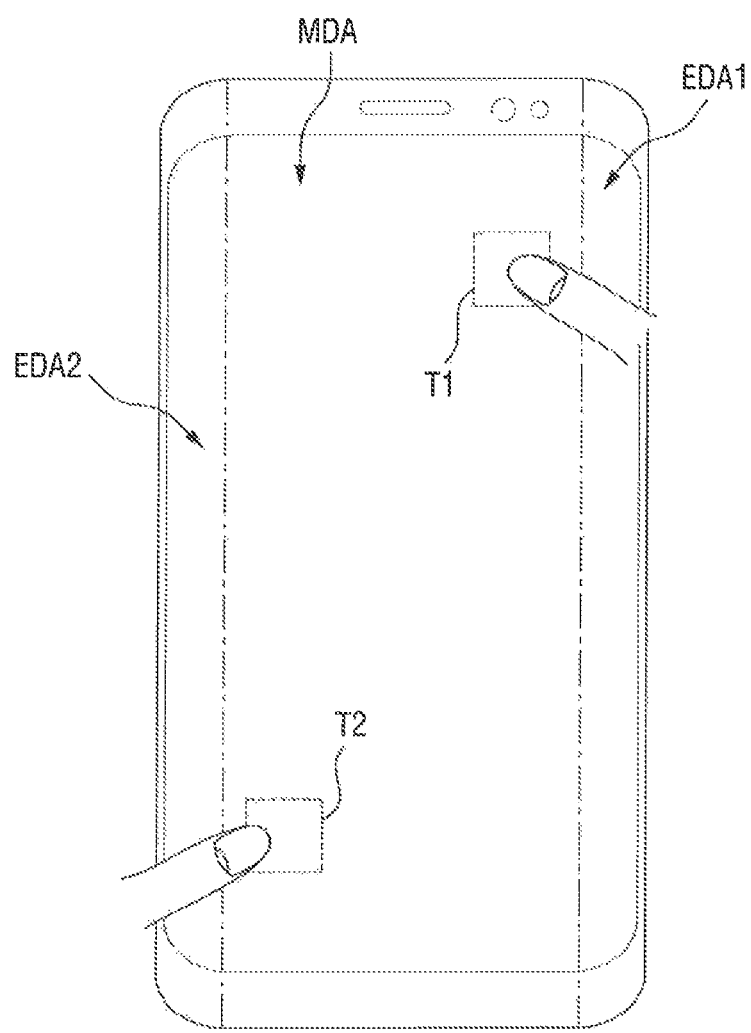
FIGS. 8A and 8B are views illustrating an example of a method of operating the display device according to exemplary embodiments of the present disclosure.
Figure 8B:
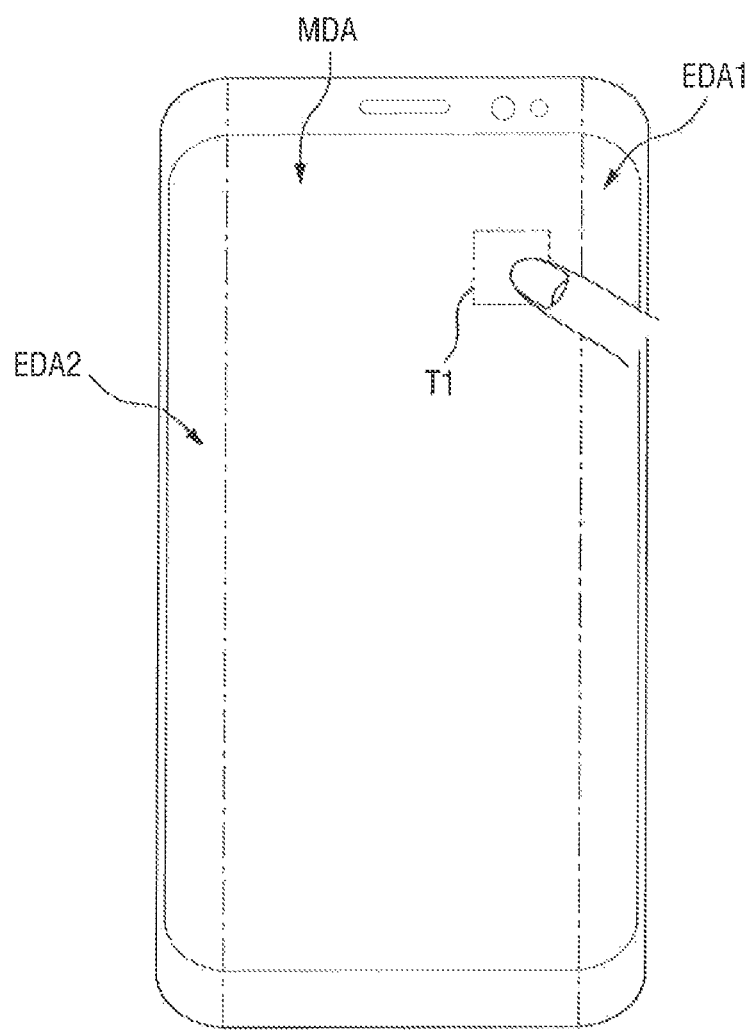

FIGS. 8A and 8B are views illustrating an example of a method of operating the display device according to exemplary embodiments of the present disclosure.

Referring to FIGS. 2 and 8A, in the case in which the user applies pressures to any two points T1 and T2, the pressure detection module 400 may detect the touch pressures at the two points T1 and T2 and perform a predetermined function when the detected values are greater than or equal to the predetermined pressure value. For example, the current displayed screen may be enlarged. Further, referring to FIG. 8B, when the user applies pressures to any two points T1 and 12 and then releases a finger touched on one of the two points T1 and T2, for example, a second point T2, the current displayed screen may be reduced. Furthermore, the pressure detection module 400 may adjust a speed of changing the screen according to the intensity of the user's touch pressure. The application function is given as an example, and the user may change the application function for his/her convenience.

Hereinafter, a display device, according to an exemplary embodiment of the present disclosure, will be described with reference to FIGS. 9 and 10. To the extent that a detailed description of various elements illustrated in FIGS. 9 and 10 are omitted, it may be assumed that these elements are at least similar to corresponding elements that have previously been described with respect to FIGS. 1 to 8B.

Figure 9:
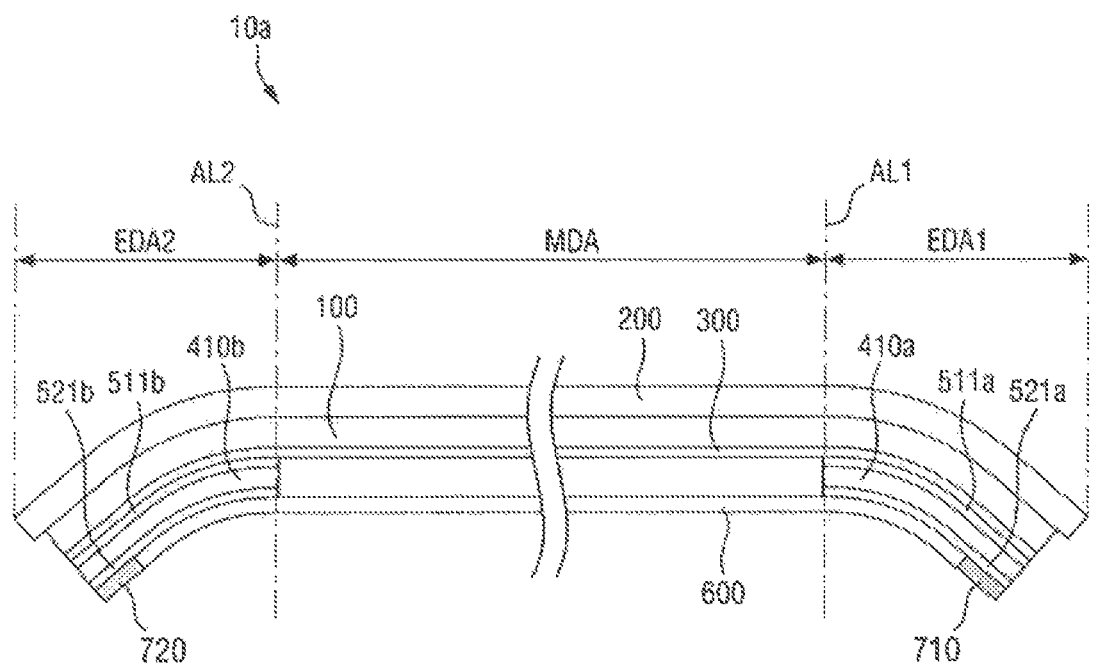
FIGS. 9 and 10 are a cross-sectional view and a perspective view schematically illustrating a display device according to an exemplary embodiment of the present disclosure.

FIG. 9 is a cross-sectional view schematically illustrating the display device according to an exemplary embodiment of the present disclosure.

Referring to FIG. 9, a display device 10a may include pressure detection modules 410a and 410b disposed only in a first edge display portion EDA1 and a second edge display portion EDA2. For example, the pressure detection modules 410a and 410b may at least partially overlap the first edge display portion EDA1 and the second edge display portion EDA2, respectively. For example, the pressure detection modules are not disposed in regions overlapping the central display portion MDA. Therefore, bump members 511a, 511b, 512a, and 521b may also be disposed only in regions in which the pressure detection modules 410a and 410b are formed.

Figure 10:
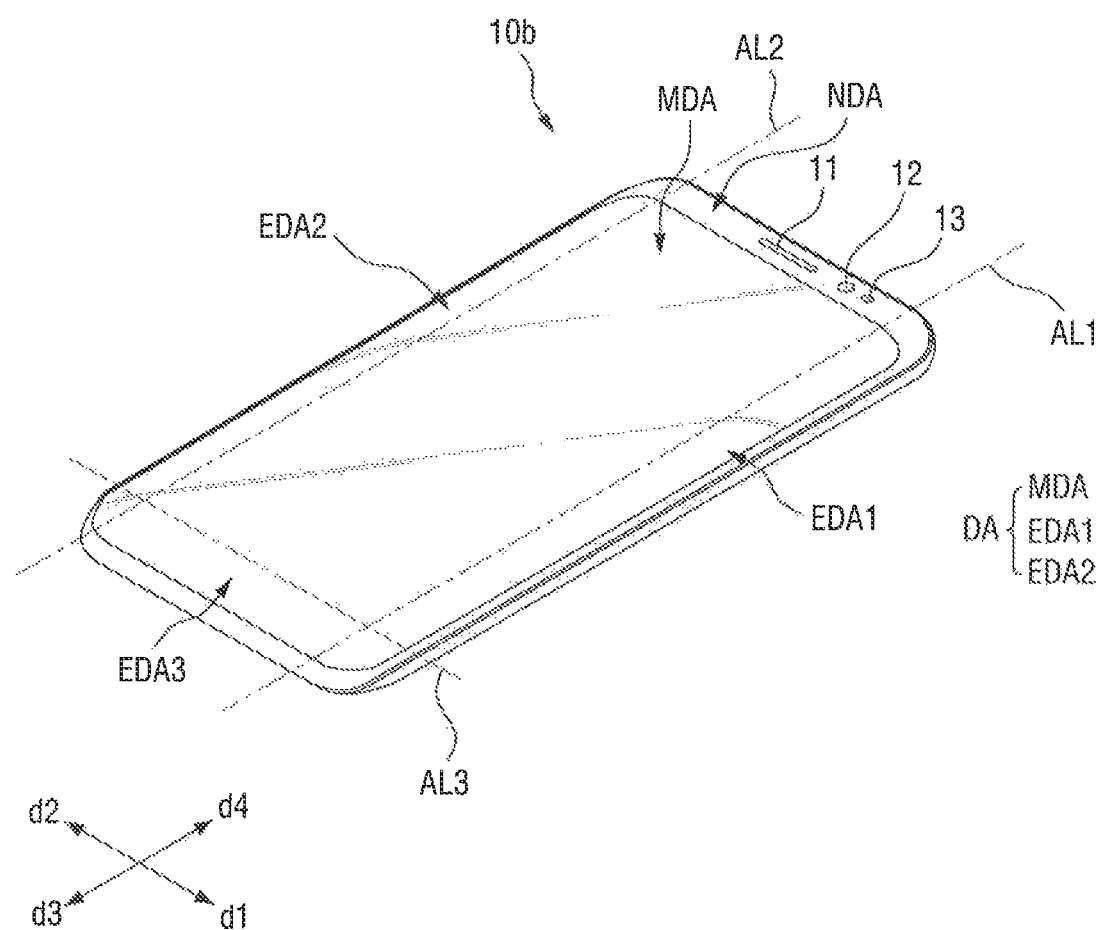

FIG. 10 is a perspective view schematically illustrating a display device according to an exemplary embodiment of the present disclosure.

Referring to FIG. 10, a display device 10b may further include a third edge display portion EDA3. The third edge display portion EDA3 may be located adjacent to the central display portion MDA in a third direction d3 with respect to a third imaginary line AL3. In one exemplary embodiment of the present disclosure, the third edge display portion EDA3 may be bent to have a predetermined curvature.

A pressure detection module may be disposed to at least partially overlap the third edge display portion EDA3. Accordingly, a touch position and pressure of the user may be detected also in the third edge display portion EDA3.

The display device 10b is described as including any of the first to third edge display portions EDA1 to EDA3, but the present disclosure is not limited thereto. For example, the display device 10b may include at least one of the first to third edge display portions EDA1 to EDA3. Further, an edge display portion may be additionally located on an upper side of the display device 10b and a region adjacent to the central display portion MDA in a fourth direction d4.

According to exemplary embodiments of the present disclosure, a touch position and a touch pressure can be efficiently detected even in an edge display portion.

Further, an area of a display region can be enlarged by removing conventional physical buttons.

Further, user convenience can be increased using a pressure detection module.

The effects of the present invention are not limited by the foregoing, and other various effects are anticipated herein.

Although exemplary embodiments of the present invention have been disclosed for illustrative purposes, those skilled in the art will appreciate that various modifications, additions and substitutions are possible, without departing from the scope and spirit of the present disclosure.

While the present invention has been particularly illustrated and described with reference to exemplary embodiments thereof, it will be understood by those of ordinary skill in the art that various changes in form and detail may be made therein without departing from the spirit and scope of the present invention as defined by the following claims.

What is claimed is:

1. A display device, comprising:
   a display panel including a central display portion and a first edge display portion extending from the central display portion and including a first bent region;
   a pressure detection module overlapping the first edge display portion, wherein the pressure detection module includes a first sensing electrode and a second sensing electrode which extend in different directions; and
   a bump member in direct contact with the pressure detection module, wherein the bump member includes a plurality of first protruding patterns each of which overlaps a node defined as a region in which the first sensing electrode and the second sensing electrode cross,
   wherein the pressure detection module is disposed below the display panel, and
   wherein the display device further comprises a composite sheet disposed between the display panel and the pressure detection module.

2. The display device of claim 1, wherein the bump member includes a first base layer in direct contact with a first surface of the pressure detection module and a first bump portion having the plurality of first protruding patterns extending from the first base layer.

3. The display device of claim 2, wherein the bump member further includes a second base layer in direct contact with a second surface of the pressure detection module that is opposite to the first surface of the pressure detection module and a second bump portion having a plurality of second protruding patterns extending from the second base layer.

4. The display device of claim 1, wherein the plurality of first protruding patterns extend from a first surface of the pressure detection module in a first direction.

5. The display device of claim 4, wherein the bump member further includes a plurality of second protruding patterns extending from a second surface of the pressure detection module that is opposite the first surface of the pressure detection module in a second direction opposite the first direction.

6. The display device of claim 1, wherein the first sensing electrode and the second sensing electrode are disposed on different layers.

7. The display device of claim 1, wherein:
   the display panel further includes a second edge display portion extending from the central display portion and including a second bent region;
   the first edge display portion is symmetrical to the second edge display portion with respect to the central display portion; and
   the pressure detection module at least partially overlaps the second edge display portion.

8. The display device of claim 7, wherein:
   the first edge display portion includes a first squeezing region;
   the second edge display portion includes a second squeezing region; and
   the pressure detection module performs a squeezing operation when pressure is simultaneously applied to both the first squeezing region and the second squeezing region.

9. The display device of claim 1, wherein the pressure detection module is configured to operate in an underwater operating mode when a touch input area is greater than or equal to ¼ of a total area of the first edge display portion.

10. A display device, comprising:
a display panel including a central display portion and a first edge display portion extending from the central display portion and including a first bent region;
a pressure detection module overlapping the first edge display portion; and
a bump member in direct contact with the pressure detection module and including a plurality of first protruding patterns,
wherein the pressure detection module includes a plurality of first sensing electrodes extending in a first direction and a plurality of second sensing electrodes extending in a second direction, crossing the first direction, the second sensing electrodes being insulated from the plurality of first sensing electrodes,
wherein at least one of the plurality of first protruding patterns is disposed in a region in which the plurality of first sensing electrodes and the plurality of second sensing electrodes cross,
wherein the pressure detection module is disposed below the display panel, and
wherein the display device further comprises a composite sheet disposed between the display panel and the pressure detection module.

11. The display device of claim 10, wherein:
the bump member further includes a first base layer in direct contact with a first surface of the pressure detection module; and
the plurality of first protruding patterns extend from the first base layer in a third direction that is different from the first and second directions.

12. The display device of claim 11, wherein the bump member further includes a second base layer in direct contact with a second surface of the pressure detection module that is opposite to the first surface of the pressure detection module and a plurality of second protruding patterns extending from the second base layer in a fourth direction opposite the third direction.

13. The display device of claim 10, wherein the plurality of first protruding patterns are in direct contact with a first surface of the pressure detection module.

14. The display device of claim 11, wherein the composite sheet includes a buffer sheet and/or a heat dissipation sheet.

15. The display device of claim 11, wherein:
the display panel further includes a second edge display portion extending from the central display portion and including a second bent region;
the first edge display portion is symmetrical with respect to the second edge display portion about the central display portion; and
the pressure detection module at least partially overlaps the second edge display portion.

16. The display device of claim 15, wherein:
the first edge display portion includes a first squeezing region;
the second edge display portion includes a second squeezing region; and
the pressure detection module performs a squeezing operation when pressure is simultaneously applied to both the first squeezing region and the second squeezing region.

17. The display device of claim 10, wherein the pressure detection module is configured to operate in an underwater operating mode when a touch input area is greater than or equal to ¼ of an area of the first edge display portion.

18. A display device, comprising:
a display panel including a substantially flat display region, a first substantially curved display region on one side of the substantially flat display region, and a second substantially curved display region on an opposite side of the substantially flat display region, wherein the substantially flat display region and the first and second substantially curved display regions are configured to display an image;
a first bump portion disposed below the display panel;
a pressure detection module disposed below the first bump portion;
a second bump portion disposed below the pressure detection module;
a composite sheet disposed between the display panel and the first bump portion,
wherein each of the first bump portion and the second bump portion includes a base layer and a protruding pattern,
wherein the protruding pattern substantially aligns with intersections of sensing lines of the pressure detection module,
wherein each of the first bump portion and the second bump portion includes a bent portion and the bent portion overlaps the first or second substantially curved display regions, and
wherein the composite sheet comprises a buffer sheet and a heat dissipation sheet.

* * * * *